(12) United States Patent
Kwak et al.

(10) Patent No.: US 8,174,661 B2
(45) Date of Patent: May 8, 2012

(54) LIQUID CRYSTAL DISPLAY AND METHOD THEREOF

(75) Inventors: Sang-Ki Kwak, Cheonan-si (KR); Hyang-Shik Kong, Seongnam-si (KR); Dong-Yoon Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 475 days.

(21) Appl. No.: 12/409,673

(22) Filed: Mar. 24, 2009

(65) Prior Publication Data

US 2010/0045920 A1  Feb. 25, 2010

(30) Foreign Application Priority Data

Aug. 20, 2008  (KR) .................. 10-2008-0081436

(51) Int. Cl.
*G02F 1/1339* (2006.01)
*G02F 1/1343* (2006.01)
*G02F 1/1345* (2006.01)

(52) U.S. Cl. ......... 349/149; 349/139; 349/151; 349/153

(58) Field of Classification Search .................. 349/149, 349/153, 139, 151
See application file for complete search history.

(56) References Cited

U.S. PATENT DOCUMENTS

| 2004/0046918 A1* | 3/2004 | Song ............................ 349/141 |
| 2005/0162601 A1* | 7/2005 | Matsuoka et al. ............ 349/141 |
| 2006/0066604 A1* | 3/2006 | Yang ............................. 345/204 |
| 2006/0139556 A1* | 6/2006 | Ahn et al. ..................... 349/153 |
| 2006/0215102 A1* | 9/2006 | Otose et al. .................. 349/151 |
| 2007/0211202 A1* | 9/2007 | Ishii et al. .................... 349/153 |
| 2008/0143945 A1* | 6/2008 | Jeong et al. .................. 349/139 |

* cited by examiner

*Primary Examiner* — Brian M. Healy
*Assistant Examiner* — Jerry Blevins
(74) *Attorney, Agent, or Firm* — Cantor Colburn LLP

(57) ABSTRACT

A liquid crystal display includes a first insulating substrate including a display area and a peripheral area, a display area signal line in the display area of the first insulating substrate, a peripheral area signal line in the peripheral area of the first insulating substrate, a driving circuit portion in the peripheral area of the first insulating substrate, receiving an input signal through the peripheral area signal line, and thereby generating an output signal to supply to the display area signal line, a second insulating substrate facing the first insulating substrate and having a common electrode, a liquid crystal layer interposed between the first insulating substrate and the second insulating substrate, and a first sealant disposed between the first insulating substrate and the second insulating substrate and sealing the liquid crystal layer, wherein the common electrode is disposed on a whole surface of the second insulating substrate, and the first sealant is closer to the display area than the peripheral area signal line.

33 Claims, 9 Drawing Sheets

LIQUID CRYSTAL DISPLAY AND METHOD THEREOF

This application claims priority to Korean Patent Application No. 10-2008-0081436, filed on Aug. 20, 2008, and all the benefits accruing therefrom under 35 U.S.C. §119, the contents of which in its entirety are herein incorporated by reference.

BACKGROUND OF THE INVENTION (a) Field of the Invention The present invention relates to a liquid crystal display ("LCD") and method thereof. More particularly, the present invention relates to an LCD having an improved display quality, and a method of improving the display quality of the LCD.

(b) Description of the Related Art

Liquid crystal displays ("LCDs") are one of the most widely used flat panel displays, and an LCD includes a pair of panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines the orientations of LC molecules therein to adjust polarization of incident light.

Signal lines, thin film transistors ("TFTs"), and pixel electrodes may be formed on one of two display panels that the liquid crystal display ("LCD") includes, and a common electrode may be formed on the other.

BRIEF SUMMARY OF THE INVENTION

It has been determined herein, according to the present invention, that the signal lines and the common electrode of a conventional liquid crystal display ("LCD") are disposed opposite to each other as conductors such that parasitic capacitance is generated therebetween, and the parasitic capacitance delays and distorts the signal transmitted along the signal lines. Particularly, a signal line such as a clock signal line disposed in the circumference of the display area and having a wide width generates a large parasitic capacitance along with the common electrode, thereby generating serious delay and distortion of the signal.

The present invention reduces parasitic capacitance of an LCD to improve the display quality thereof.

The present invention also provides a method of improving a display quality of an LCD.

An LCD according to an exemplary embodiment of the present invention includes a first insulating substrate including a display area and a peripheral area, a display area signal line in the display area of the first insulating substrate, a peripheral area signal line in the peripheral area of the first insulating substrate, a driving circuit portion in the peripheral area of the first insulating substrate, receiving an input signal through the peripheral area signal line, and thereby generating an output signal to supply to the display area signal line, a second insulating substrate facing the first insulating substrate and having a common electrode, a liquid crystal layer interposed between the first insulating substrate and the second insulating substrate, and a first sealant between the first insulating substrate and the second insulating substrate and sealing the liquid crystal layer, wherein the common electrode is disposed on a whole surface of the second insulating substrate, and the first sealant is closer to the display area than the peripheral area signal line.

A pixel electrode on the first insulation substrate and having a plurality of slits may be further included.

A light blocking member in the display area and the peripheral area of the first insulating substrate and covering the driving circuit portion may be further included.

The first sealant may be interposed between the light blocking member and the common electrode.

The first sealant may overlap the driving circuit portion.

A second sealant between the first insulation substrate and the second insulation substrate and disposed outside of a circumference of the first sealant may be further included.

At least a portion of the light blocking member may not be disposed between the first sealant and the second sealant.

A region between the first sealant and the second sealant may be in a vacuum state.

The second sealant may overlap a peripheral area signal line furthest from a display area among peripheral area signal lines.

The driving circuit portion may be a gate driving circuit that is integrated directly on the first insulation substrate.

The peripheral area signal line may include a first clock signal line supplying a first clock signal to the gate driving circuit and a second clock signal line transmitting a second clock signal having an opposite phase to that of the first clock signal.

A spacer in the peripheral area of the first insulating substrate may be further included.

The spacer may include at least one color filter layer and a light blocking member layer on the color filter layer.

An LCD according to another exemplary embodiment of the present invention includes a first insulating substrate including a display area for displaying images and a peripheral area outside of a circumference of the display area, a gate line in the display area of the first insulating substrate, a gate pad in the peripheral area of the first insulating substrate and connected to an output terminal of a gate driving circuit chip, a peripheral area signal line connecting the gate line and the gate pad to each other, a second insulating substrate facing the first insulating substrate and including a common electrode, a liquid crystal layer interposed between the first insulation substrate and the second insulation substrate, and a first sealant between the first insulating substrate and the second insulating substrate and sealing the liquid crystal layer, wherein a distance between the first sealant and the display area is shorter than a distance between the gate pad and the first sealant, and the common electrode is formed on a whole surface of the second insulation substrate.

A method of improving a display quality of an LCD according to another exemplary embodiment of the present invention includes providing a first display panel including a display area and a peripheral area with a peripheral area signal line and a driving circuit portion in the peripheral area, disposing a second display panel opposite the first display panel, the second display panel including a common electrode overlapping the peripheral area and display area of the first display panel, interposing a liquid crystal layer between the first and second display panels, and reducing a parasitic capacitance between the common electrode and the peripheral area signal line by disposing a first sealant between the first and second display panels in an area closer to the display area than the peripheral area signal line.

In an exemplary embodiment of the present invention, the sealant is closer to the display area than the gate driving signal lines for supplying the gate driving circuit such that air or vacuum having a lower dielectric rate than that of the liquid crystal material is disposed between the gate driving signal lines and the common electrode. Accordingly, parasitic capacitance generated between the gate driving signal lines and the common electrode is reduced.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present invention. In some exemplary embodiments, well-known parts and well-known techniques will not be described in detail to avoid ambiguous interpretation of the present disclosure. In every possible case, like reference numerals will be used to refer to the same or similar elements in the description and drawings.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. On the other hand, when an element is referred to as being "directly on" another element, there are no intervening elements present. In contrast, it will be understood that when an element such as a layer, film, region, or substrate is referred to as being "below" another element, it can be directly below the other element or intervening elements may also be present. On the other hand, when an element is referred to as being "directly below" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Now, a liquid crystal display ("LCD") according to an exemplary embodiment of the present invention will be described with reference to FIG. 1 to FIG. 3.

Figure 1:
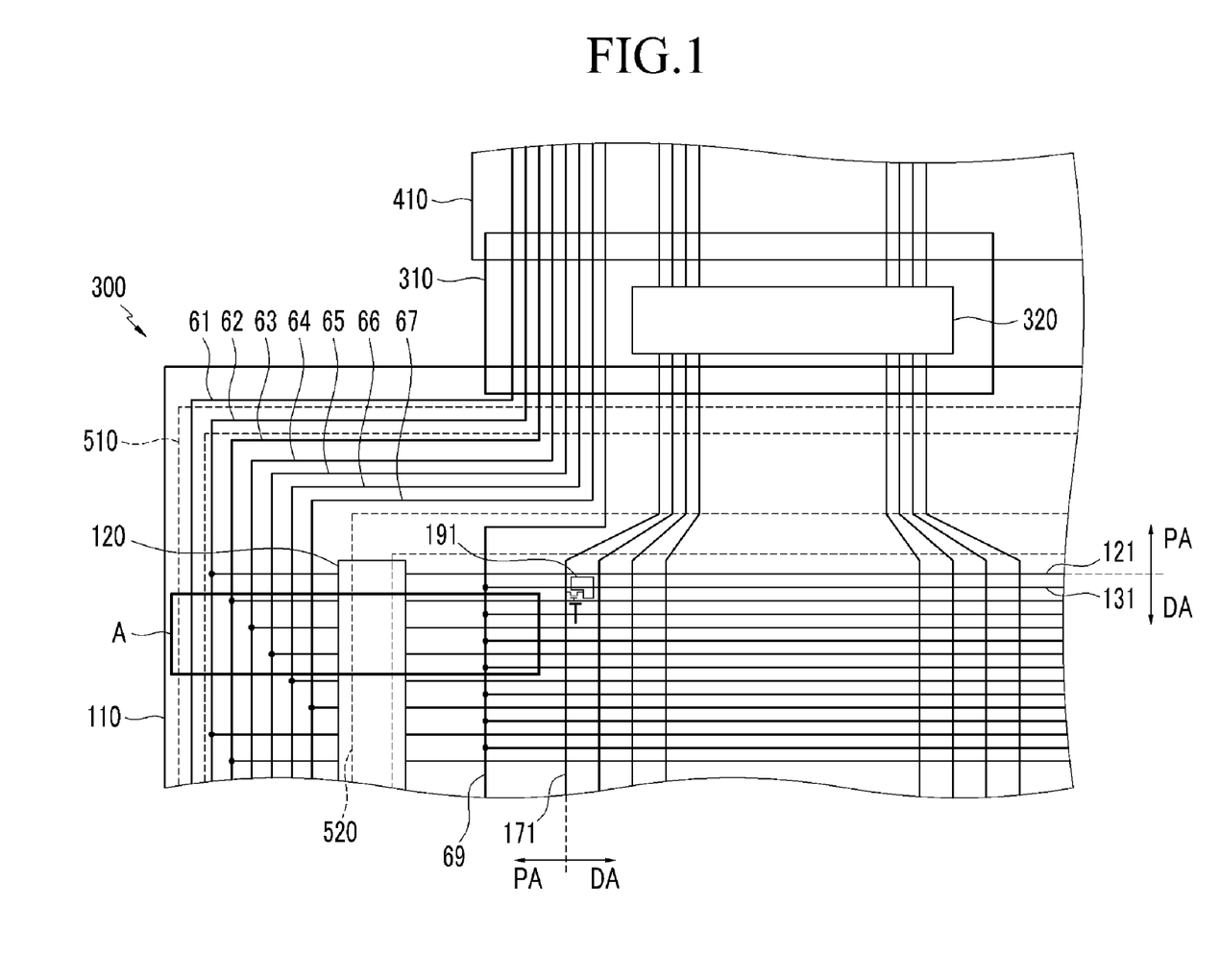
FIG. 1 is a layout view of an exemplary liquid crystal display ("LCD") according to an exemplary embodiment of the present invention.
Figure 2:
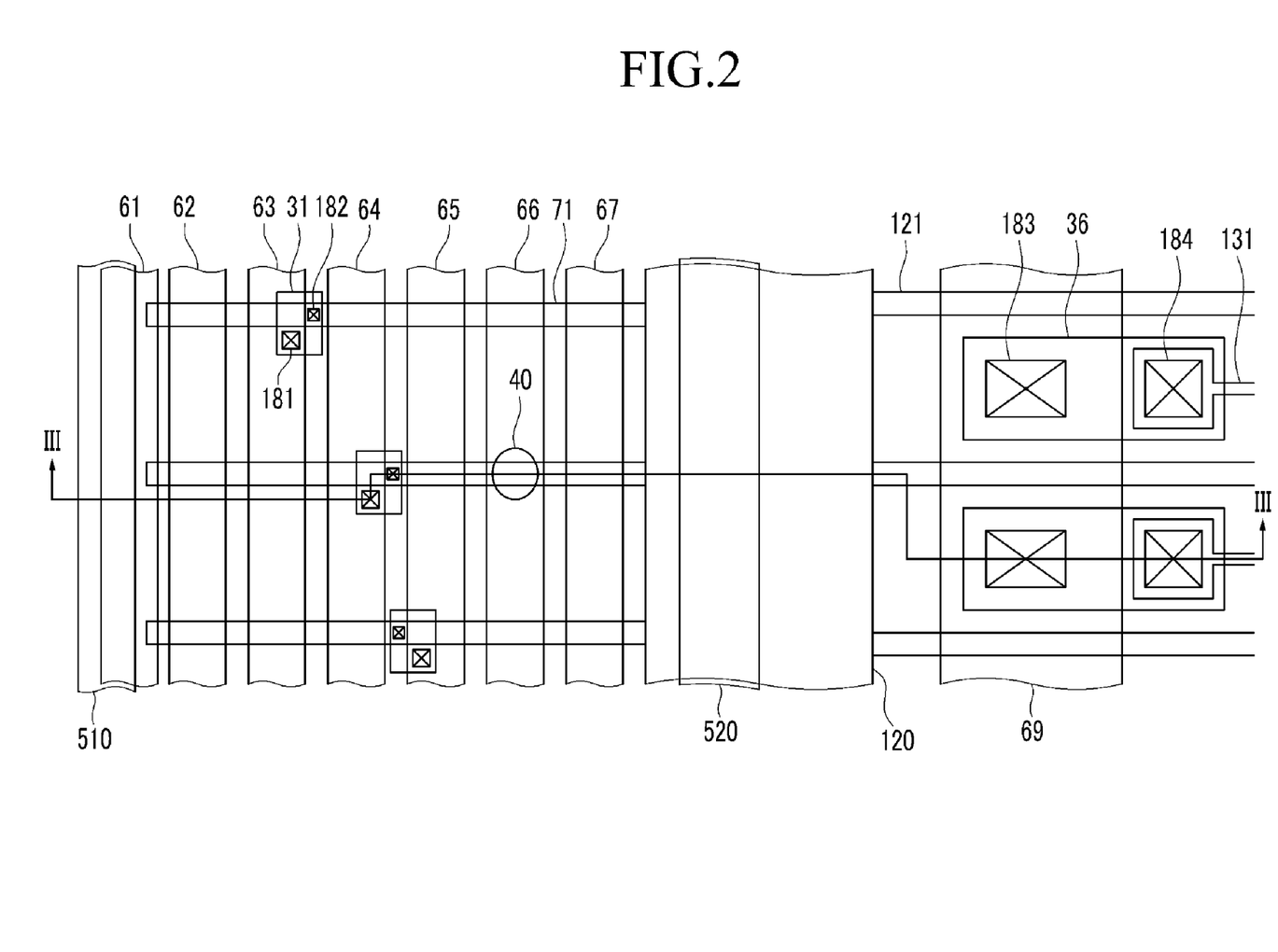
FIG. 2 is an enlarged layout view of region A of FIG. 1.
Figure 3:
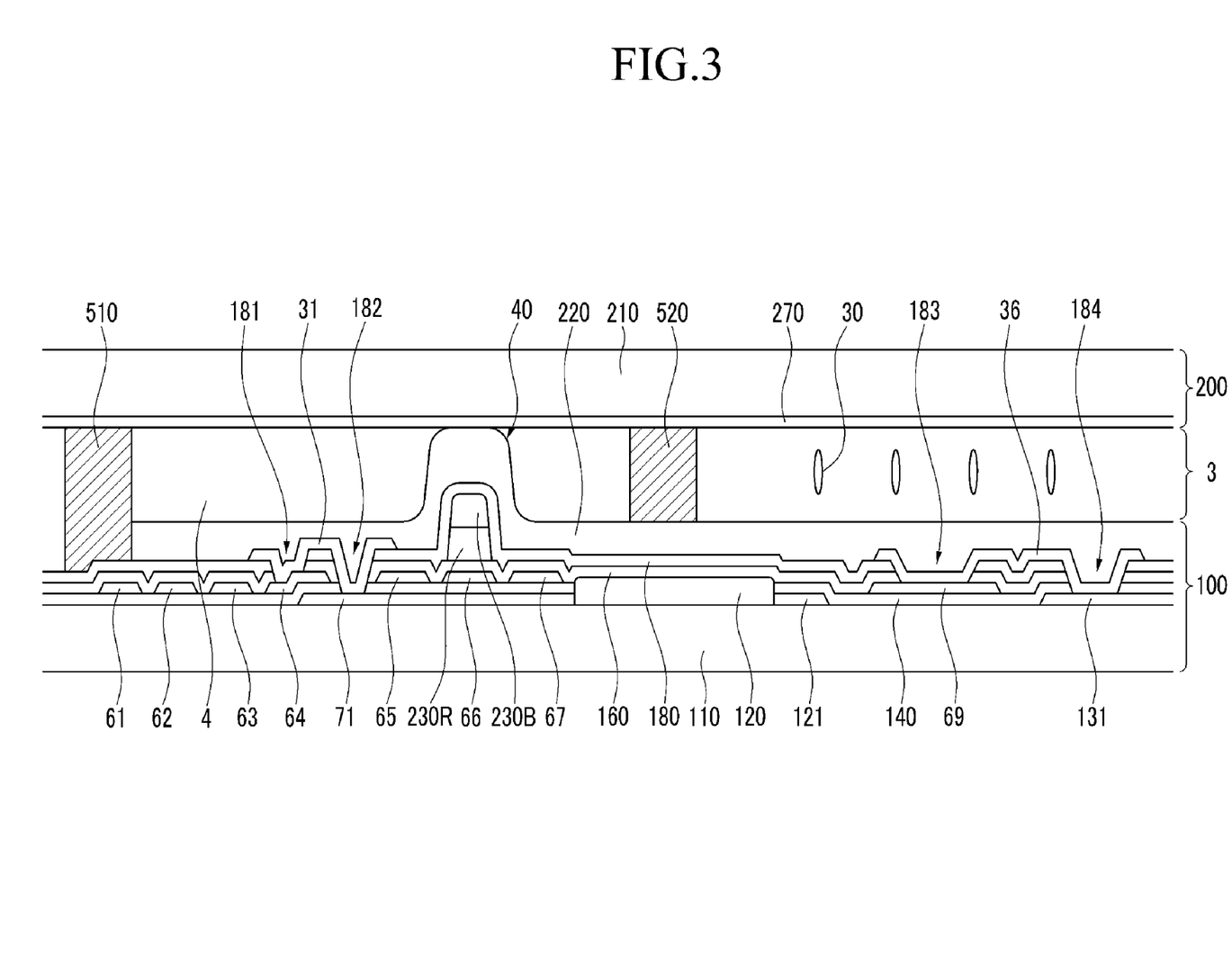
FIG. 3 is a cross-sectional view taken along line III-III of FIG. 2.
Figure 4:
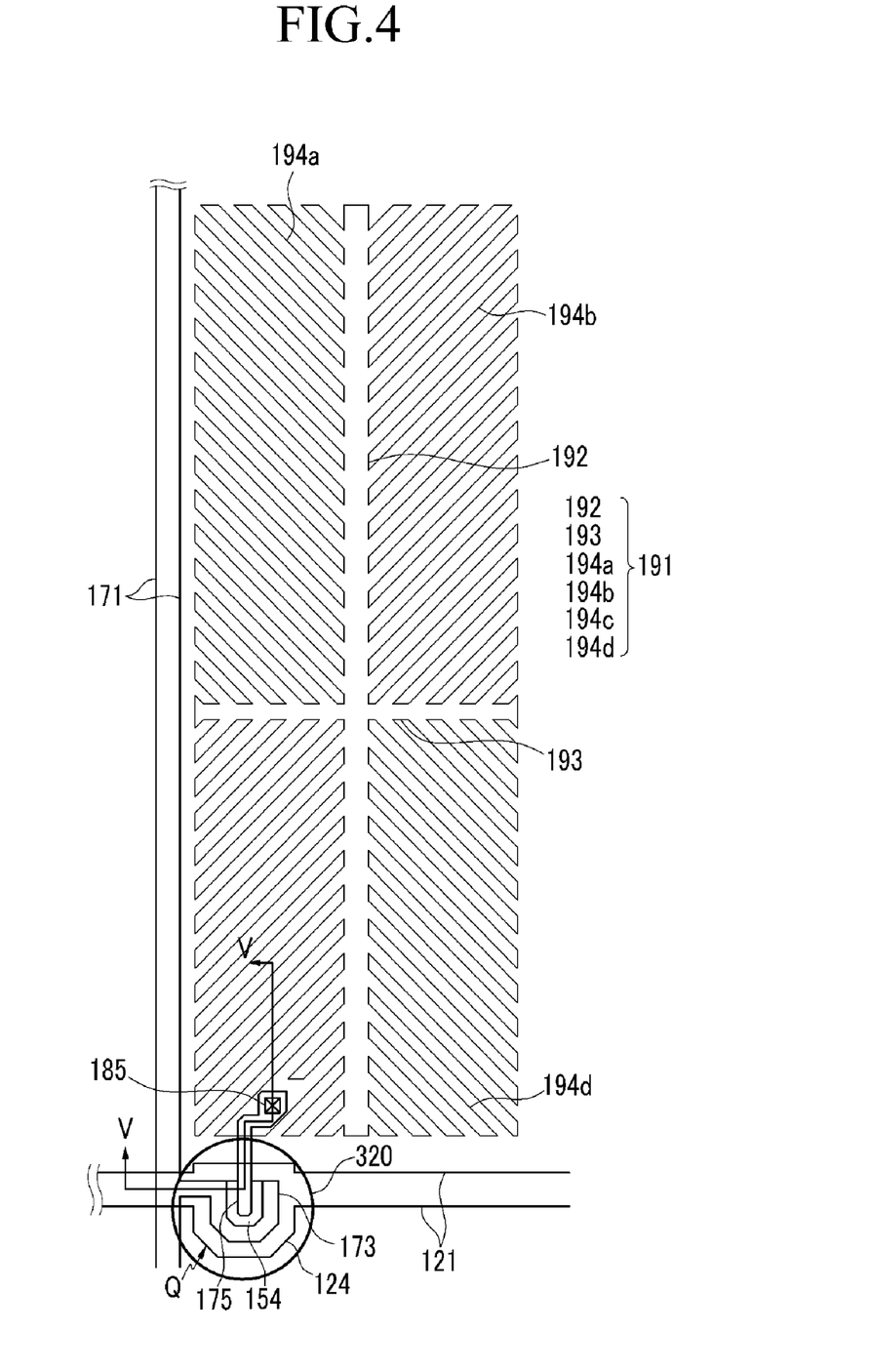
FIG. 4 is an enlarged layout view of one exemplary pixel area of FIG. 1.
Figure 5:
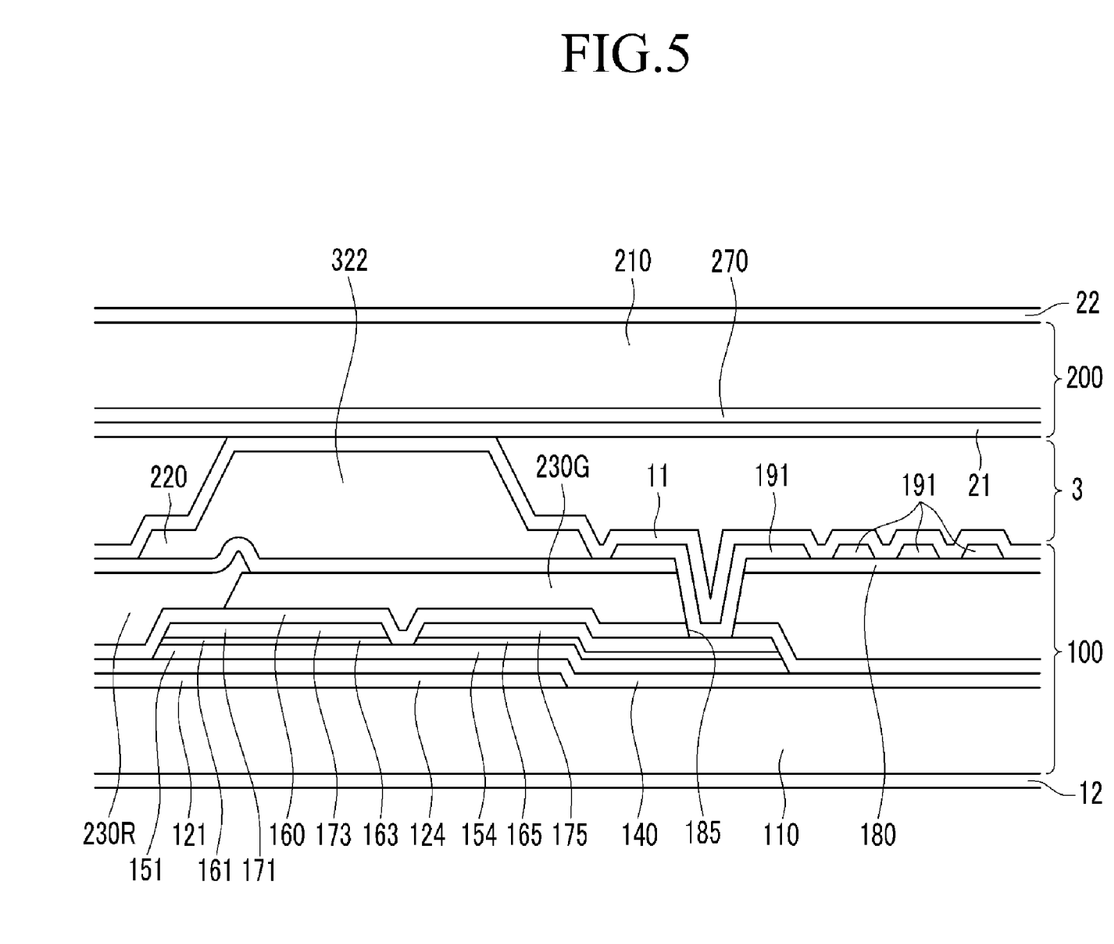
FIG. 5 is a cross-sectional view taken along line V-V of FIG. 4.

FIG. 1 is a layout view of an exemplary LCD according to an exemplary embodiment of the present invention, FIG. 2 is an enlarged layout view of region A of FIG. 1, and FIG. 3 is a cross-sectional view taken along line III-III of FIG. 2. FIG. 4 is an enlarged layout view of one exemplary pixel area of FIG. 1, and FIG. 5 is a cross-sectional view taken along line V-V of FIG. 4.

An LCD according to an exemplary embodiment of the present invention includes a liquid crystal panel assembly 300, a flexible circuit board 310 connected thereto, and a driving circuit board 410 connected to the flexible circuit board 310. A data driving integrated circuit ("IC") 320 and a plurality of signal lines for connecting the driving circuit board 410 to gate driving signal lines 61, 62, 63, 64, 65, 66, and 67 of the liquid crystal panel assembly 300 and a storage voltage supplying line 69 are mounted on the flexible circuit board 310.

The liquid crystal panel assembly 300 includes a first display panel 100, a second display panel 200, and a liquid crystal layer 3 interposed between the two display panels 100 and 200. Sealants 510 and 520 are formed or otherwise disposed between the two display panels 100 and 200, and the liquid crystal layer 3 is enclosed between the display panels 100 and 200 by the inner sealant 520. The space 4 between the inner sealant 520 and the outer sealant 510 may be in a vacuum state.

The first display panel 100 includes a display area DA where the images are displayed, and a peripheral area PA that is disposed outside of the display area DA and that is not used for the display. Some signal lines pass through the peripheral area PA and the gate driving circuit 120 is formed or otherwise disposed in the peripheral area PA.

The display area DA includes a plurality of pixel areas arranged in a matrix by the intersection of gate lines 121 extending in a row direction, a first direction, and data lines 171 extending in a column direction, a second direction substantially perpendicular to the first direction. Each pixel area includes a thin film transistor T and a pixel electrode 191. The display area DA also includes storage electrode lines 131 extending in the row direction.

A gate driving circuit 120 is integrated in the peripheral area PA, and the gate driving signal lines 61, 62, 63, 64, 65, 66, and 67 and the storage voltage supplying line 69 for supplying various signals are formed or otherwise disposed in the peripheral area PA, and outer signal lines for connecting the data driving IC 320 and each data line 171 are formed or otherwise disposed in the peripheral area PA. The gate driving signal lines 61, 62, 63, 64, 65, 66, and 67 include a common voltage (Vss) line 61, first clock signal (CK) lines 62, 63, and 64, and second clock signal (CKB) lines 65, 66, and 67 transmitting a second clock signal having an opposite phase to that of the first clock signal. The gate driving signal lines 61, 62, 63, 64, 65, 66, and 67 are connected to the gate driving circuit 120 for supplying the corresponding signals, and the gate driving circuit 120 generates a scanning signal through the supplied signals and outputs it to each gate line 121. The storage voltage supplying line 69 is connected to all storage electrode lines 131, thereby supplying a storage voltage thereto.

According to an exemplary embodiment of the present invention, the inner sealant 520 is disposed closer to the display area DA than the gate driving signal lines 61, 62, 63, 64, 65, 66, and 67. The inner sealant 520 may be formed or otherwise disposed at a position overlapping the gate driving circuit 120 in the peripheral area PA.

The first display panel 100 includes an insulating substrate 110 and a plurality of thin films formed or otherwise disposed thereon, and the second display panel 200 includes an insulating substrate 210 and a common electrode 270 and an alignment layer 21 formed or otherwise disposed thereon.

The first display panel 100 will be described with reference to FIG. 3 to FIG. 5 in detail.

A gate line 121, a storage electrode line 131, and a connection line 71 are formed or otherwise disposed on the insulating substrate 110 that is made of a material such as transparent glass or plastic.

The gate line 121 transmits a gate signal, extends in a transverse direction, such as the first direction, and includes gate electrodes 124. The storage electrode line 131 is applied with a predetermined voltage and extends substantially parallel to the gate line 121. The connection line 71 connects the gate driving signal lines 61, 62, 63, 64, 65, 66, and 67 and the gate driving circuit 120.

A gate insulating layer 140 preferably made of silicon nitride (SiNx) or silicon oxide (SiOx) is formed or otherwise disposed on the gate line 121, the storage electrode line 131, and the connection line 71, and may be further formed or otherwise disposed on exposed portions of the insulating substrate 110.

A plurality of semiconductor stripes 151 preferably made of hydrogenated amorphous silicon ("a-Si") or a crystallized silicon are formed or otherwise disposed on the gate insulating layer 140. The semiconductor stripes 151 include protrusions 154.

An ohmic contact stripe 161 and an ohmic contact island 165 are formed or otherwise disposed on the semiconductor stripe 151. The ohmic contact stripe 161 includes protrusions 163 facing the ohmic contact island 165 on the gate electrode 124 and an end portion 169 having a wide area. The ohmic contacts 161 and 165 are preferably made of n+ hydrogenated a-Si heavily doped with an N-type impurity such as phosphorous, or they may be made of a silicide.

A plurality of data lines 171 and a plurality of drain electrodes 175 are formed or otherwise disposed on the ohmic contacts 161 and 165 and the gate insulating layer 140.

Also, the gate driving signal lines 61, 62, 63, 64, 65, 66, and 67 and the storage voltage supplying line 69 are formed or otherwise disposed on the gate insulating layer 140 in the peripheral area PA.

The data lines 171 transmit data voltages, and extend in a longitudinal direction, the second direction, thereby intersecting the gate lines 121. In an exemplary embodiment, the data lines 171 and the gate lines 121 may define pixel areas. The data lines 171 include a plurality of source electrodes 173 which may be curved with a "U" shape.

The drain electrodes 175 are separated from the data lines 171. The drain electrodes 175 start from one end portion enclosed by the source electrodes 173, and finish at another end portion with a wide area.

A gate electrode 124, a source electrode 173, and a drain electrode 175 form a thin film transistor ("TFT") along with a protrusion 154 of a semiconductor stripe 151, and the channel of the TFT is formed in the protrusion 154 of the semiconductor stripe 151 between the source electrode 173 and the drain electrode 175.

The semiconductor stripes 151 may have substantially the same planar shape as the data lines 171, the drain electrodes 175, and the underlying ohmic contacts 161 and 165. However, the semiconductor stripes 151 have portions that are exposed without being covered by the data lines 171 and the drain electrodes 175, as well as portions between the source electrodes 173 and the drain electrodes 175. That is, the semiconductor islands 151 are all disposed under the data lines 171 and the drain electrodes 175, and the ohmic contact layers 161, 163, and 165, and are exposed on the channel between the source electrodes 173 and the drain electrodes 175.

The gate driving circuit 120 includes elements such as TFTs and capacitors, and signal lines for connecting them to each other, and the elements and the signal lines are realized by thin film patterns formed with the same layer as the gate line 121, the gate insulating layer 140, the semiconductor layer, the ohmic contact layer, and the data line 171.

A passivation layer 160 is formed or otherwise disposed on the data lines 171, the drain electrodes 175, the exposed portion of the semiconductor stripes 151, the gate driving signal lines 61, 62, 63, 64, 65, 66, and 67 and the storage voltage supplying line 69. The passivation layer 160 is made of an inorganic insulator such as silicon nitride or silicon oxide. The passivation layer 160 has a contact hole 185 exposing the wide end portion of the drain electrode 175.

Color filters 230R, 230G, and 230B are formed or otherwise disposed on the passivation layer 160. The color filters 230R, 230G, and 230B may include red, green, and blue color filters 230R, 230G, and 230B, and one of the red, green, and blue color filters 230R, 230G, and 230B may be disposed per each pixel in the display area DA. At least two of the red, green, and blue color filters 230R, 230G, and 230B may be overlapped with each other in the peripheral area PA. FIG. 3 shows a case in which the red color filter 230R and the blue color filter 230B are overlapped with each other in the peripheral area PA. The color filters 230R, 230G, and 230B may be made of a photosensitive organic material including pigments.

An overcoat 180 is formed or otherwise disposed on the color filters 230R, 230G, and 230B. The overcoat 180 is made of an inorganic insulator such as silicon nitride or silicon oxide.

A pixel electrode 191 and wiring connecting members 31 and 36 preferably made of a transparent conductive material such as indium tin oxide ("ITO") or indium zinc oxide ("IZO") are formed or otherwise disposed on the overcoat 180. The pixel electrode 191 is connected to the drain electrode 175 through the contact hole 185 passing through the overcoat 180, the color filters 230R, 230G, and 230B, and the passivation layer 160. The wiring connecting member 31 connects the gate driving signal lines 61, 62, 63, 64, 65, 66, and 67 and the connection line 71 to each other through contact holes 181 and 182 of the insulating layers 140, 160, and 180, and the wiring connecting member 36 connects the storage voltage supplying line 69 and the storage electrode line 131 to each other through the contact holes 183 and 184 of the insulating layers 140, 160, and 180.

Referring to FIG. 4, the overall shape of each pixel electrode 191 is a rectangle, and each pixel electrode 191 may include a transverse stem 193, a longitudinal stem 192 intersecting the transverse stem 193, and a plurality of first to fourth minute branches 194a, 194b, 194c, and 194d. In such an embodiment, the pixel electrode 191 is divided into a first sub-region, a second sub-region, a third sub-region, and a fourth sub-region by the transverse stem 193 and the longitudinal stem 192, and the first to fourth sub-regions respectively include the plurality of first, second, third, and fourth minute branches 194a, 194b, 194c, and 194d.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. Also, the third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a-194d form an angle of about 45 degrees or 135 degrees with the gate lines 121 or the transverse stem 193. Also, the minute branches 194a-194d of two neighboring sub-regions may be perpendicular to each other.

The pixel electrodes 191 are physically and electrically connected to the drain electrodes 175 through the contact holes 185, and receive data voltages from the drain electrodes 175. The pixel electrodes 191 applied with the data voltages and a common electrode 270 of the second display panel 200 generate an electric field that determines the orientations of liquid crystal molecules 30 of the liquid crystal layer 3 between two electrodes 191 and 270. Accordingly, the luminance of the light transmitted through the liquid crystal layer 3 differs depending on the thusly determined orientation of the liquid crystal molecules 30.

The edges of the first to fourth minute branches 194a-194d distort the electric field, and form a horizontal component that determines an inclined direction of liquid crystal molecules 30. The horizontal component of the electric field is perpendicular to the edges the first to fourth minute branches 194a-194d. Accordingly, the liquid crystal molecules 30 are inclined in the direction parallel to the length direction of the minute branches 194a-194d. In an exemplary embodiment of the present invention, the length directions in which the minute branches 194a-194d are extended in one pixel PX are all four directions such that the inclined directions of the liquid crystal molecules 30 are all four directions. Therefore, the viewing angle of the LCD is widened by varying the inclined directions of the liquid crystal molecules 30.

A light blocking member 220 and main spacers 322, also known as column spacers, are formed or otherwise disposed on the pixel electrodes 191 and the wiring connecting member 31 and 36. The light blocking member 220 prevents the light from being transmitted through the region where the liquid crystal molecules 30 of the liquid crystal layer 3 are not controlled or the external light from being reflected in the display area DA, and covers the signal lines such as the gate driving circuit 120 and the wiring connecting members 31 and 36 in the peripheral area PA to protect them. The light blocking member 220 is also formed or otherwise disposed on the portion where the color filters 230R and 230B are overlapped with each other, thereby forming assistance spacers 40. The assistance spacers 40 maintain the interval between the first display panel 100 and the second display panel 200. The portion where the assistance spacers 40 of the light blocking member 220 are formed may be thicker than other portions. Also, the light blocking member 220 may be integrally formed with the same material as the main spacers 322 in the display area DA. In this case, a photosensitive film for a light blocking member is coated and exposed by using a mask including a transparent region, a translucent region, and an opaque region, and is developed to form the photosensitive film for the light blocking member having a thick portion and a thin portion such that the thick portion functions as the spacers 40 and 322 and the thin portion functions as the light blocking member 220.

An alignment layer 11 is formed or otherwise disposed on the light blocking member 220 and the main spacers 322.

An inner sealant 520 is formed or otherwise disposed on the light blocking member 220. It is shown that an outer sealant 510 is formed on the overcoat 180, however the light blocking member 220 may also be disposed under the outer sealant 510. Also, the alignment layer 11, shown in FIG. 5, may be disposed under both the inner sealant 520 and the outer sealant 510 or one of them.

The second display panel 200 includes an insulating substrate 210 and a common electrode 270 made of a transparent conductive material such as ITO or IZO on the whole surface, or substantially the entire surface, of the insulating substrate 210. An alignment layer 21, shown in FIG. 5, is formed or otherwise disposed on the common electrode 270. Accordingly, the second display panel 200 is only formed through the deposition of the common electrode 270 and the formation of the alignment layer 21, thereby simplifying the manufacturing process.

As above-described, the light blocking member 220 covers the signal lines such as the gate driving circuit 120 and the wiring connecting members 31 and 36 such that the gate driving circuit 120 may be prevented from being damaged by ball spacers (not shown) included in the sealant 520 even though the inner sealant 520 overlaps the gate driving circuit 120.

According to an exemplary embodiment of the present invention, if the inner sealant 520 is disposed closer to the display area DA than the gate driving signal lines 61, 62, 63, 64, 65, 66, and 67, the liquid crystal layer 3 does not exist on the gate driving signal lines 61, 62, 63, 64, 65, 66, and 67, and a vacuum state may be formed within the space 4. When the vacuum state having a lower dielectric rate than that of the liquid crystal layer 3 is formed between the gate driving signal lines 61, 62, 63, 64, 65, 66, and 67 and the common electrode 270, the parasitic capacitance therebetween is reduced. Accordingly, delay and distortion of the signals transmitted according to the gate driving signal lines 61, 62, 63, 64, 65, 66, and 67 may be reduced. When the space 4 between the inner sealant 520 and the outer sealant 510 is in a vacuum state, then the space between the first display panel 100 and the second display panel 200 may be decreased by atmospheric pressure, however the spacer 40 may maintain the spacing between the first and second display panels 100, 200 to prevent the decrease of space between the first and second display panels 100, 200 due to atmospheric pressure.

Figure 6:
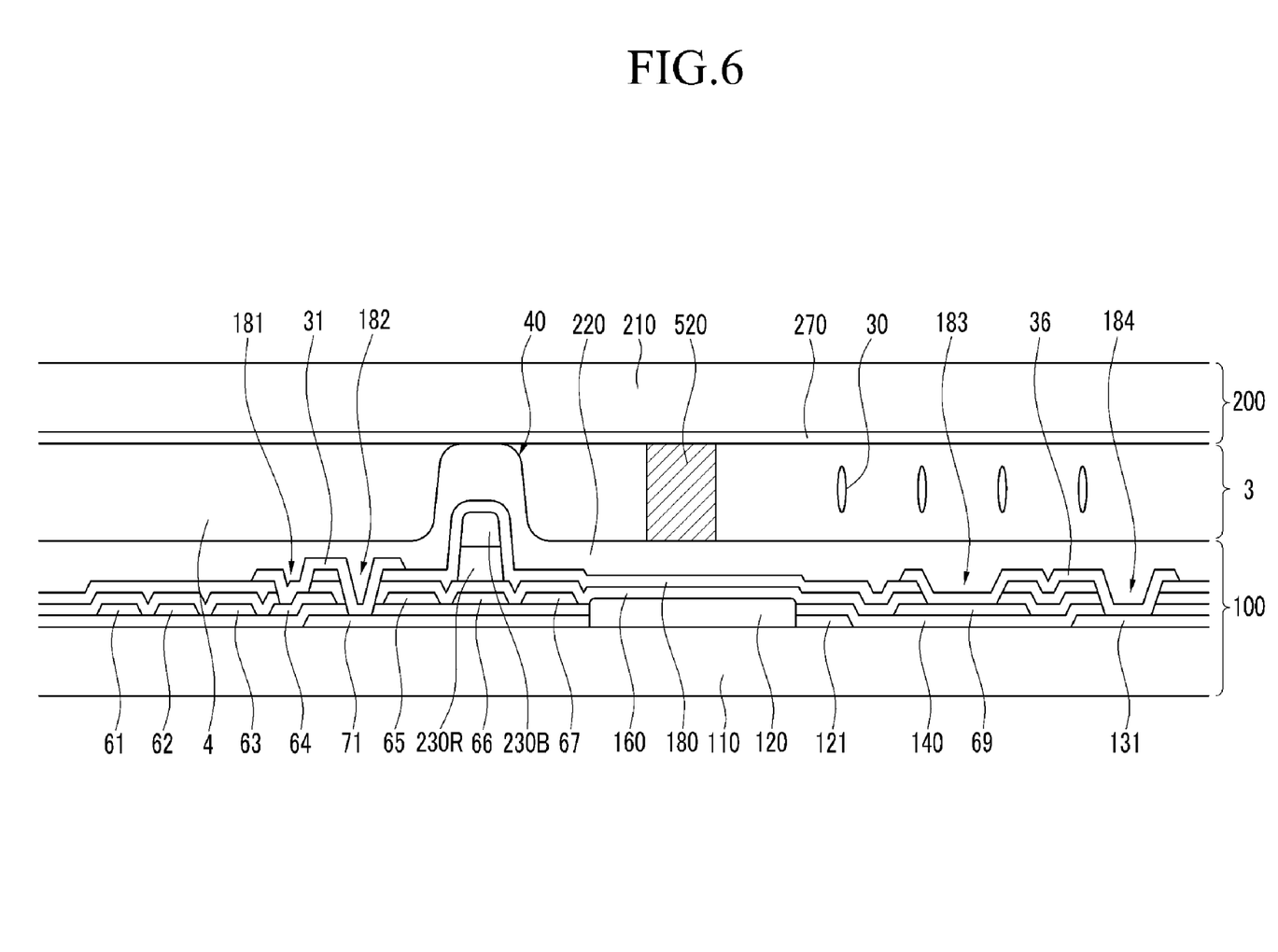
FIG. 6 to FIG. 8 are cross-sectional views of exemplary LCDs according to other exemplary embodiments of the present invention.

FIG. 6 is a cross-sectional view of an exemplary LCD according to another exemplary embodiment of the present invention.

In an exemplary embodiment of FIG. 6, the outer sealant 510 is omitted compared with the exemplary embodiment of FIG. 1 to FIG. 5. The outer sealant 510 does not exist such that air is filled between the gate driving signal lines 61, 62, 63, 64, 65, 66, and 67 and the common electrode 270. The air has a lower dielectric rate than that of the liquid crystal layer 3 such that the parasitic capacitance of the gate driving signal lines 61, 62, 63, 64, 65, 66, and 67 and the common electrode 270 is reduced.

The signal lines disposed outside the inner sealant 520 are covered by the light blocking member 220 such that the signal lines are protected from problems such as corrosion.

Figure 7:
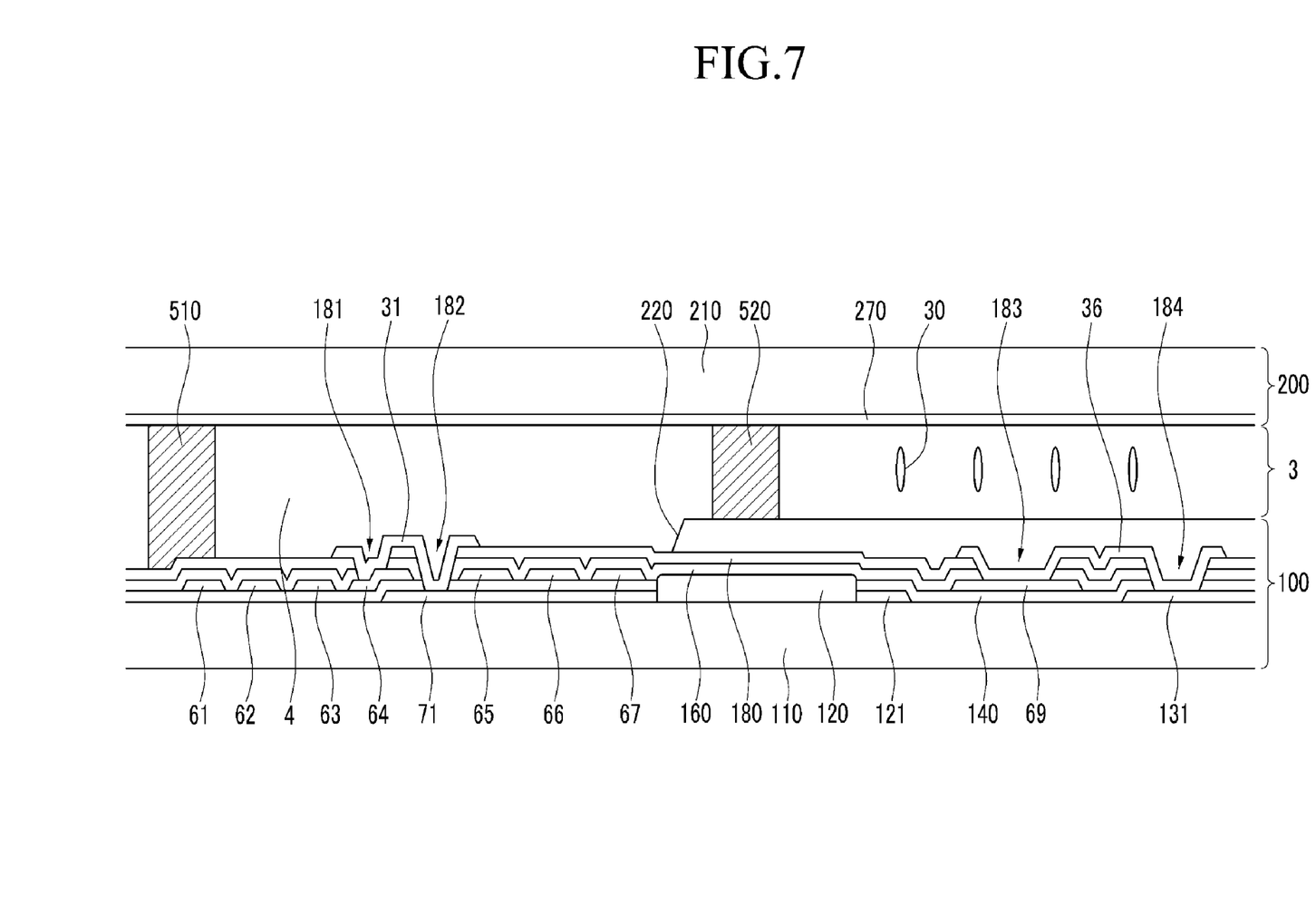

FIG. 7 is a cross-sectional view of an exemplary LCD according to another exemplary embodiment of the present invention.

In an exemplary embodiment of FIG. 7, the light blocking member 220 is not formed on the gate driving signal lines 61, 62, 63, 64, 65, 66, and 67 compared with the exemplary embodiment of FIG. 1 to FIG. 5. The portion where the light blocking member 220 existed between the inner sealant 520 and the outer sealant 510 has a vacuum state such that the parasitic capacitance between the gate driving signal lines 61, 62, 63, 64, 65, 66, and 67 and the common electrode 270 is further reduced. As in the previous embodiments, the light blocking member 220 may still be formed or otherwise disposed on the gate driving circuit 120 and the inner sealant 520 may be formed or otherwise disposed on the light blocking member 220, overlapping the gate driving circuit 120.

Figure 8:
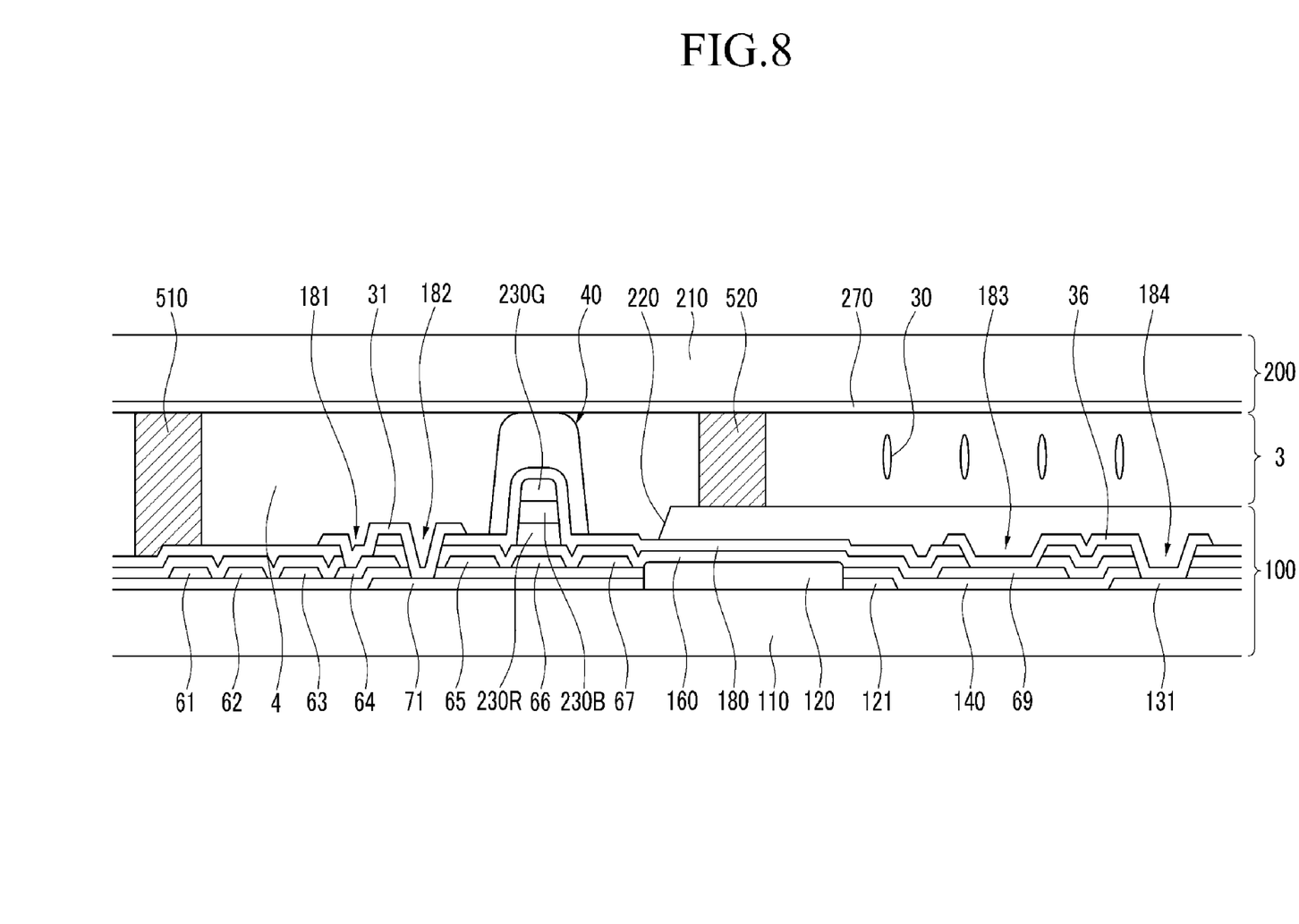

FIG. 8 is a cross-sectional view of an exemplary LCD according to another exemplary embodiment of the present invention.

In an exemplary embodiment of FIG. 8, a spacer 40 is formed or otherwise disposed in the space between the inner sealant 520 and the outer sealant 510 compared with the exemplary embodiment of FIG. 7. The spacer 40 overlaps the red, green, and blue color filters 230R, 230G, and 230B. A portion of the red, green, and blue color filters 230R, 230G, and 230B may be formed as the spacer 40. The space 4 between the inner sealant 520 and the outer sealant 510 is under vacuum such that the space between the first display panel 100 and the second display panel 200 may be decreased by atmospheric pressure, however the spacer 40 may maintain the spacing between the first and second display panels 100, 200 to prevent the decrease of space between the first and second display panels 100, 200 due to atmospheric pressure.

Figure 9:
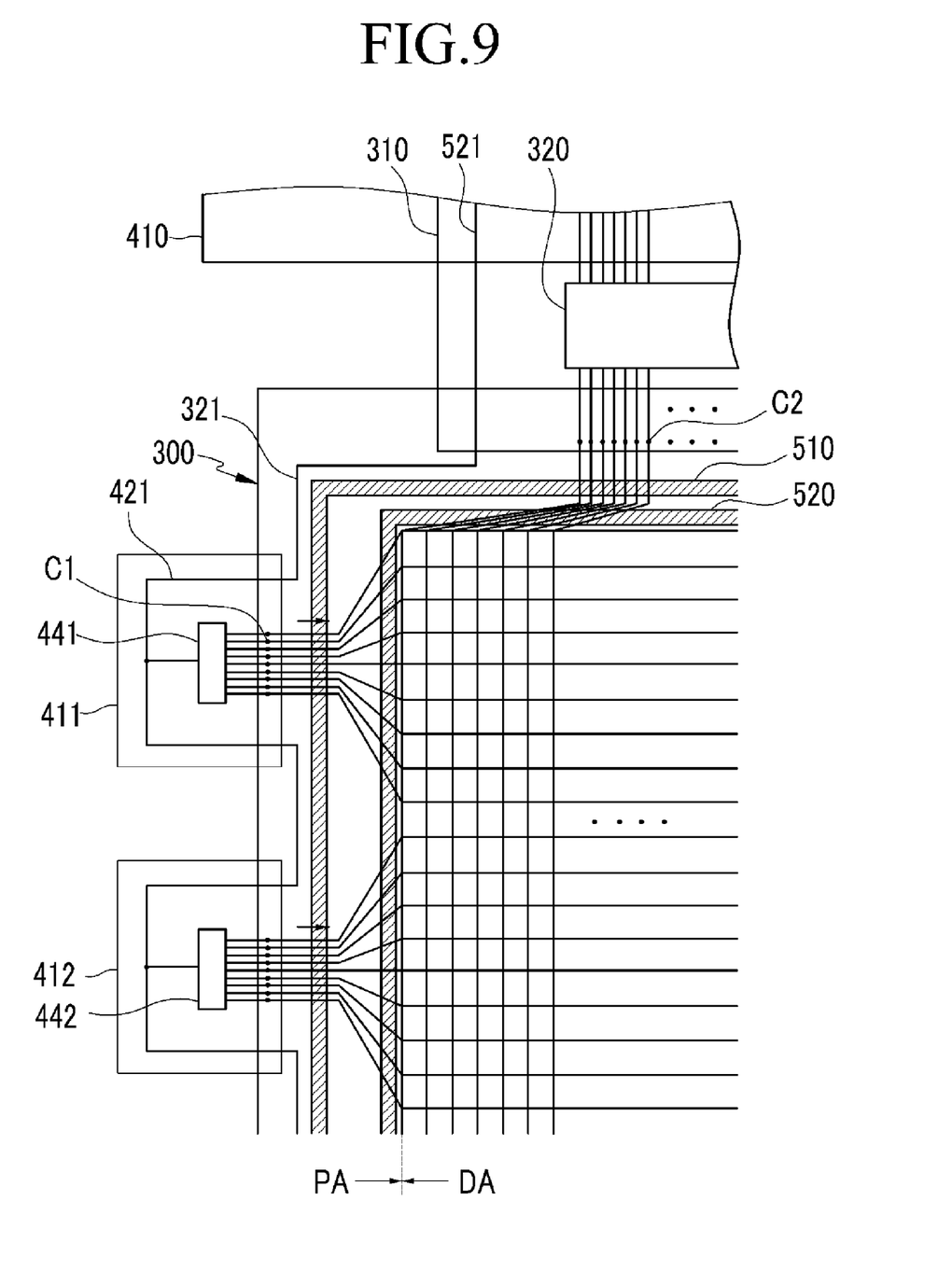
FIG. 9 is a layout view of an exemplary LCD according to another exemplary embodiment of the present invention.

FIG. 9 is a layout view of an exemplary LCD according to another exemplary embodiment of the present invention.

The present invention may be applied to the case in which the gate driving circuit is attached to the substrate 110 as a chip type as well as the case in which the gate driving circuit is integrated on the first insulation substrate.

Referring to FIG. 9, an LCD according to another exemplary embodiment of the present invention includes a liquid crystal panel assembly 300, flexible circuit boards 310, 411, and 412 connected thereto, and a driving circuit board 410 connected to the flexible circuit board 310. A data driving IC 320 is mounted on the flexible circuit board 310, and gate driving ICs 441 and 442 are mounted on the flexible circuit boards 411 and 412. Also, signal lines 521, 421, and 321 for connecting the driving circuit board 410 to the gate driving ICs 441 and 442 are formed or otherwise disposed on the flexible circuit boards 310, 411, and 412, and on the liquid crystal panel assembly 300. Each of the terminals of the gate driving ICs 441 and 442 mounted on the flexible circuit boards 411 and 412 is connected to the end portions C1 of the gate lines 121 through the signal lines formed on the flexible circuit board 411 and 412. Each of the terminals of the data driving IC 320 mounted on the flexible circuit board 310 is connected to an end portions C2 of the data lines 171 through the signal lines formed on the flexible circuit board 310.

Here, the gate driving ICs 441 and 442 and the data driving IC 320 may be mounted directly on the first display panel 100.

The liquid crystal panel assembly 300 includes, like the exemplary embodiment of FIG. 1 to FIG. 5, the first display panel 100 and the second display panel 200, and a liquid crystal layer 3 interposed between the two display panels 100 and 200. Sealants 510 and 520 are formed or otherwise disposed between the two display panels 100 and 200, and the liquid crystal layer 3 is enclosed by the inner sealant 520. The space 4 between the inner sealant 520 and the outer sealant 510 may be under vacuum. The inner sealant 520 is closer to the display area DA than the end portions C1 of the gate lines 121. In an exemplary embodiment, the distance between the display area DA and the inner sealant 520 is smaller than the distance between the inner sealant 520 and the end portion C1 of the gate line 121.

According to an exemplary embodiment of the present invention, most of the signal lines of the peripheral area PA, such as the signal lines connecting the end portions C1 of the gate lines 121 to the gate driving ICs 441 and 442, are disposed outside the inner sealant 520 such that the parasitic capacitance generated between the signal lines of the peripheral area PA and the common electrode 270 is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. The liquid crystal display comprising:
   a first insulating substrate including a display area and a peripheral area;

a display area signal line in the display area of the first insulating substrate;

a peripheral area signal line in the peripheral area of the first insulating substrate;

a driving circuit portion in the peripheral area of the first insulating substrate, receiving an input signal through the peripheral area signal line, and thereby generating an output signal to supply to the display area signal line;

a second insulating substrate facing the first insulating substrate and having a common electrode;

a liquid crystal layer interposed between the first insulating substrate and the second insulating substrate; and a first sealant between the first insulating substrate and the second insulating substrate and sealing the liquid crystal layer, wherein the common electrode is disposed on a whole surface of the second insulating substrate, and the first sealant is closer to the display area than the peripheral area signal line, wherein a dielectric rate in an area between the peripheral area signal line and the common electrode is lower than that of the liquid crystal layer.

2. The liquid crystal display of claim 1, further comprising a pixel electrode on the first insulation substrate and having a plurality of slits.

3. The liquid crystal display of claim 2, further comprising a light blocking member in the display area and the peripheral area of the first insulating substrate, and covering the driving circuit portion.

4. The liquid crystal display of claim 3, wherein the first sealant is interposed between the light blocking member and the common electrode.

5. The liquid crystal display of claim 4, wherein the first sealant overlaps the driving circuit portion.

6. The liquid crystal display of claim 5, further comprising a second sealant between the first insulation substrate and the second insulation substrate, and disposed outside of a circumference of the first sealant.

7. The liquid crystal display of claim 6, wherein at least a portion of the light blocking member is not disposed between the first sealant and the second sealant.

8. The liquid crystal display of claim 7, wherein a region between the first sealant and the second sealant is in a vacuum state.

9. The liquid crystal display of claim 8, wherein the second sealant overlaps a peripheral area signal line furthest from the display area among peripheral area signal lines.

10. The liquid crystal display of claim 9, wherein the driving circuit portion is a gate driving circuit that is integrated directly on the first insulation substrate.

11. The liquid crystal display of claim 10, wherein the peripheral area signal line includes a first clock signal line supplying a first clock signal to the gate driving circuit and a second clock signal line transmitting a second clock signal having an opposite phase to that of the first clock signal.

12. The liquid crystal display of claim 11, further comprising a spacer in the peripheral area of the first insulating substrate.

13. The liquid crystal display of claim 12, wherein the spacer includes at least one color filter layer and a light blocking member layer on the color filter layer.

14. The liquid crystal display of claim 4, further comprising a spacer in the peripheral area of the first insulation substrate.

15. The liquid crystal display of claim 14, wherein the spacer includes at least one color filter layer and a light blocking member layer on the color filter layer.

16. The liquid crystal display of claim 2, further comprising a second sealant between the first insulation substrate and the second insulation substrate, and disposed outside of a circumference of the first sealant.

17. The liquid crystal display of claim 16, wherein a region between the first sealant and the second sealant is in a vacuum state.

18. The liquid crystal display of claim 17, wherein the second sealant overlaps a peripheral area signal line furthest from the display area among peripheral area signal lines.

19. The liquid crystal display of claim 18, further comprising an organic layer disposed in the display area and the peripheral area of the first insulation substrate, and covering the driving circuit portion.

20. A liquid crystal display comprising:

a first insulating substrate including a display area which displays images and a peripheral area outside of a circumference of the display area;

a gate line in the display area of the first insulating substrate;

a gate pad in the peripheral area of the first insulating substrate, and connected to an output terminal of a gate driving circuit chip;

a peripheral area signal line connecting the gate line and the gate pad to each other;

a second insulating substrate facing the first insulating substrate and including a common electrode;

a liquid crystal layer interposed between the first insulation substrate and the second insulation substrate; and a first sealant between the first insulating substrate and the second insulating substrate and sealing the liquid crystal layer, wherein a distance between the first sealant and the display area is shorter than a distance between the gate pad and the first sealant, and the common electrode is on the whole surface of the second insulation substrate, and wherein a dielectric rate in an area between the peripheral area signal line and the common electrode is lower than that of the liquid crystal layer.

21. The liquid crystal display of claim 20, further comprising a pixel electrode on the first insulating substrate and having a plurality of slits.

22. The liquid crystal display of claim 21, wherein a light blocking member is in the display area and the peripheral area of the first insulating substrate, and covers the peripheral area signal line.

23. The liquid crystal display of claim 22, wherein the first sealant is interposed between the light blocking member and the common electrode.

24. The liquid crystal display of claim 23, further comprising a second sealant between the first insulating substrate and the second insulating substrate, and disposed outside of a circumference of the first sealant.

25. The liquid crystal display of claim 24, wherein
at least a portion of the light blocking member is not disposed in a region between the first sealant and the second sealant.

26. The liquid crystal display of claim 25, wherein
the region between the first sealant and the second sealant is in a vacuum state.

27. The liquid crystal display of claim 26, further comprising
a spacer in the peripheral area of the first insulation substrate.

28. The liquid crystal display of claim 27, wherein
the spacer includes at least one color filter layer and a light blocking member layer on the color filter layer.

29. The liquid crystal display of claim 21, further comprising
a spacer in the peripheral area of the first insulating substrate.

30. The liquid crystal display of claim 29, wherein
the spacer includes at least one color filter layer and a light blocking member layer on the color filter layer.

31. The liquid crystal display of claim 21, further comprising:
a second sealant between the first insulation substrate and the second insulation substrate, and disposed outside of a circumference of the first sealant.

32. The liquid crystal display of claim 31, wherein
a region between the first sealant and the second sealant is in a vacuum state.

33. A method of improving a display quality of a liquid crystal display, the method comprising:
providing a first display panel including a display area and a peripheral area with a peripheral area signal line and a driving circuit portion in the peripheral area;
disposing a second display panel opposite the first display panel, the second display panel including a common electrode overlapping the peripheral area and display area of the first display panel;
interposing a liquid crystal layer between the first and second display panels; and,
reducing a parasitic capacitance between the common electrode and the peripheral area signal line by disposing a first sealant between the first and second display panels in an area closer to the display area than the peripheral area signal line,
wherein a dielectric rate in an area between the peripheral area signal line and the common electrode is lower than that of the liquid crystal layer.

* * * * *